US011556007B2

(12) United States Patent
Ha

(10) Patent No.: US 11,556,007 B2
(45) Date of Patent: Jan. 17, 2023

(54) APPARATUS EQUIPPED WITH DEPTH CONTROL FUNCTION FOR ENABLING AUGMENTED REALITY

(71) Applicant: LETINAR CO., LTD, Seoul (KR)

(72) Inventor: Jeong Hun Ha, Seoul (KR)

(73) Assignee: LETINAR CO., LTD, Seoul (KR)

( * ) Notice: Subject to any disclaimer, the term of this patent is extended or adjusted under 35 U.S.C. 154(b) by 277 days.

(21) Appl. No.: 16/891,512

(22) Filed: Jun. 3, 2020

(65) Prior Publication Data

US 2020/0292829 A1 Sep. 17, 2020

Related U.S. Application Data

(63) Continuation of application No. 16/085,275, filed as application No. PCT/KR2016/013098 on Nov. 14, 2016, now Pat. No. 10,768,427.

(30) Foreign Application Priority Data

Mar. 18, 2016 (KR) .................... 10-2016-0032750

(51) Int. Cl.
*G02B 27/01* (2006.01)
*G02B 7/06* (2021.01)
(Continued)

(52) U.S. Cl.
CPC .......... *G02B 27/0172* (2013.01); *G02B 7/06* (2013.01); *G06T 19/006* (2013.01);
(Continued)

(58) Field of Classification Search
CPC .............. G02B 27/0172; G02B 7/06; G02B 2027/0127; G02B 2027/0178;
(Continued)

(56) References Cited

U.S. PATENT DOCUMENTS 8,337,015 B2   12/2012   Sugihara et al.
8,487,277 B2    7/2013   Labrot et al.
(Continued)

FOREIGN PATENT DOCUMENTS

JP   2011053367 A   3/2011
JP   2013065022 A   4/2013
(Continued)

*Primary Examiner* — Thomas K Pham
*Assistant Examiner* — Henry A Duong
(74) *Attorney, Agent, or Firm* — Rabin & Berdo, P.C.

(57) ABSTRACT

The present invention relates to an apparatus equipped with a depth of field control function for enabling augmented reality, which is capable of controlling the depth of field and focus and also preventing an image from being blurred due to diffraction by using a pseudo-pinhole effect. The apparatus includes: a display unit configured to generate a virtual image; a circular depth of field control unit configured to have a size in a range from 50 to 700 μm, and also configured to reflect the virtual image generated in the display unit, to increase the depth of field of the virtual image, and to then enable the virtual image to reach an eye of the user; and a frame part configured such that the display unit and the depth of field control unit are installed thereon or therein, and also configured to enable the user to wear the apparatus for enabling augmented reality.

10 Claims, 9 Drawing Sheets

(51) Int. Cl.
*H04N 13/344* (2018.01)
*G06T 19/00* (2011.01)

(52) U.S. Cl.
CPC ... *H04N 13/344* (2018.05); *G02B 2027/0127* (2013.01); *G02B 2027/0178* (2013.01)

(58) Field of Classification Search
CPC ............... G02B 27/01; G02B 27/0101; G02B 27/0103; G02B 27/017; G02B 27/0149; G02B 27/0176; G02B 27/0179; G02B 2027/0105; G02B 27/0189; G02B 2027/0107; G02B 2027/0109; G02B 2027/011; G02B 2027/0112; G02B 2027/0114; G02B 2027/0116; G02B 2027/0118; G02B 2027/012; G02B 2027/0121; G02B 2027/0123; G02B 2027/0125; G02B 2027/0129; G02B 2027/013; G02B 2027/0132; G02B 2027/0134; G02B 2027/0136; G02B 2027/0138; G02B 2027/014; G02B 2027/0141; G02B 2027/0143; G02B 2027/0145; G02B 2027/0147; G02B 2027/015; G02B 2027/0152; G02B 2027/0154; G02B 2027/0156; G02B 2027/0158; G02B 2027/0159; G02B 2027/0161; G02B 2027/0163; G02B 2027/0165; G02B 2027/0167; G02B 2027/0169; G02B 2027/0174; G02B 2027/0181; G02B 2027/0183; G02B 2027/0185; G02B 2027/0187; G02B 2027/019; G02B 2027/0192; G02B 2027/0194; G02B 2027/0196; G02B 2027/0198; G06T 19/006; H04N 13/344; H04N 2213/008
USPC .......................................................... 359/630
See application file for complete search history.

(56) References Cited

U.S. PATENT DOCUMENTS

| | | |
|---|---|---|
| 9,341,883 B2 | 5/2016 | Li et al. |
| 9,857,591 B2 | 1/2018 | Welch et al. |
| 2011/0051076 A1* | 3/2011 | Sugihara ................ G02C 7/086 351/158 |
| 2013/0100511 A1 | 4/2013 | Yamamoto et al. |
| 2014/0211146 A1* | 7/2014 | Gupta ...................... G02B 3/12 351/158 |
| 2015/0219896 A1 | 8/2015 | Ouderkirk et al. |
| 2016/0349509 A1* | 12/2016 | Lanier .................... G06F 3/012 |
| 2018/0149869 A1 | 5/2018 | Bergquist |

FOREIGN PATENT DOCUMENTS

| | | |
|---|---|---|
| JP | 2015532728 A | 11/2015 |
| KR | 1020120028902 A | 3/2012 |
| KR | 1020140053341 A | 5/2014 |
| KR | 1020150093568 A | 8/2015 |

* cited by examiner

APPARATUS EQUIPPED WITH DEPTH CONTROL FUNCTION FOR ENABLING AUGMENTED REALITY

CROSS-REFERENCE TO RELATED APPLICATIONS

This application is a continuation of U.S. application Ser. No. 16/085,275, filed on Sep. 14, 2018, which is a national stage application of the International Application No. PCT/KR2016/013098, filed on Nov. 14, 2016. The prior US application and the present continuation application claim the benefit of priority of Korean Patent Application No. 10-2016-0032750, filed on Mar. 18, 2016. The disclosures of these prior US and foreign applications are incorporated herein by reference.

TECHNICAL FIELD

The present invention relates to an apparatus equipped with a depth of field control function for enabling augmented reality, and more specifically to an apparatus equipped with a function for controlling depth of field for enabling augmented reality, which makes use of a mirror specially machined at a micrometer level, thereby controlling depth of field and focus and also preventing an image from being blurred due to diffraction by using a pseudo-pinhole effect.

BACKGROUND ART

Augmented reality refers to the process of superimposing useful information, generated by a computer, on an image and then combining or augmenting them via computer programming them when an image or photo is displayed. In plain words, augmented reality refers to the process of superimposing a 3D virtual object on the real world and then displaying them. An example of an apparatus using augmented reality is a head-up display (HUD). An HUD is applied to the canopy or helmet of a fighter plane or tank, and enables a pilot or tank operator to view various types of information while viewing geographic features. Currently, people can often see an HUD being applied to a vehicle and displaying information, such as speed or the like, on the windshield of the vehicle.

Another example of augmented reality is a glasses-type apparatus known as a so-called "Google Glass." Such a glasses-type apparatus equipped with a depth of field control function for enabling augmented reality implements augmented reality by superimposing a real world image and a 3D virtual image on each other and then displaying them in a field of view when a user wears the apparatus in the same manner as he or she wears glasses.

FIG. 1 shows a conventional glasses-type apparatus for enabling augmented reality. "Patent document 1 (KR 10-2014-0053341 A)" discloses the conventional glasses-type apparatus for enabling augmented reality. The conventional glasses-type apparatus for enabling augmented reality includes a projector 1 configured to generate an image, a transparent prism 3 configured to reflect the generated image to thus enable the image to reach an eye of a user, and a frame 5 configured to fasten the projector 1 and the transparent prism 3, and enables a user to simultaneously view an image reflected by the transparent prism 3 while viewing a real world image via the transparent prism 3.

However, the conventional glasses-type apparatus for enabling augmented reality, which is disclosed in patent document 1, surface-reflects a planar image, generated in the projector 1, via the transparent prism 3. Accordingly, when a user focuses on an object in the real world, it is impossible to focus on a virtual image generated in the projector 1, and thus a problem arises in that the user cannot simultaneously focus on both the object in the real world and the virtual image.

Furthermore, the conventional apparatus uses the transparent prism 3, and thus the apparatus has some weight and volume. Accordingly, it is inconvenient to wear the conventional apparatus, and the conventional apparatus is disharmonious because the appearance of the conventional apparatus is different from that of typical glasses or sun glasses.

Moreover, the projector 1 and the transparent prism 3 are installed in front of a single eye, and thus images viewed by both eyes are different, thereby causing inconvenience (when projectors and transparent prisms are installed in front of both eyes in order to solve the above problem, the weight and volume of the apparatus are increased, and thus a problem arises in that the conventional apparatus slides down while a user is wearing it or it is difficult to wear the conventional apparatus for a long time).

DISCLOSURE

Technical Problem

The present invention has been conceived to overcome the above-described problems, and an object of the present invention is to provide an apparatus equipped with a depth of field control function for enabling augmented reality, which enables a user to naturally and simultaneously focus on both an object in the real world and a virtual image without additionally effort, which has a light weight, a small size, and a simple structure, and which is not disharmonious when it is applied to existing wearing equipment, such as glasses, goggles, or a helmet.

Technical Solution

An apparatus equipped with a depth of field control function for enabling augmented reality according to the present invention is an apparatus for enabling augmented reality, which is worn by a user, and is characterized by including: a display unit configured to generate a virtual image; a circular depth of field control unit configured to have a size in a range from 50 to 700 μm, and also configured to reflect the virtual image generated in the display unit, to increase the depth of field of the virtual image, and to then enable the virtual image to reach an eye of the user; and a frame part configured such that the display unit and the depth of field control unit are installed thereon or therein, and also configured to enable the user to wear the apparatus for enabling augmented reality.

Advantageous Effects

The apparatus equipped with a depth of field control function for enabling augmented reality according to the present invention enables a user to acquire a virtual image having a high depth of field via the depth of field control unit, and thus the user can naturally and simultaneously focus on both an object in the real world and a virtual image without additionally effort, thereby enabling both the object in the real world and the virtual image to be simultaneously and clearly (distinctively) implemented.

Furthermore, the apparatus has a light weight, a small size, and a simple overall configuration, and thus the repair and maintenance of the apparatus are convenient.

Moreover, the appearance of the apparatus equipped with a depth of field control function for enabling augmented reality according to the present invention is almost the same as that of existing glasses or goggles, and thus there is no burden attributable to the wearing of the apparatus.

BEST MODE

An apparatus equipped with a depth of field control function for enabling augmented reality according to the present invention will be described in detail below with reference to the accompanying drawings.

Figure 2:
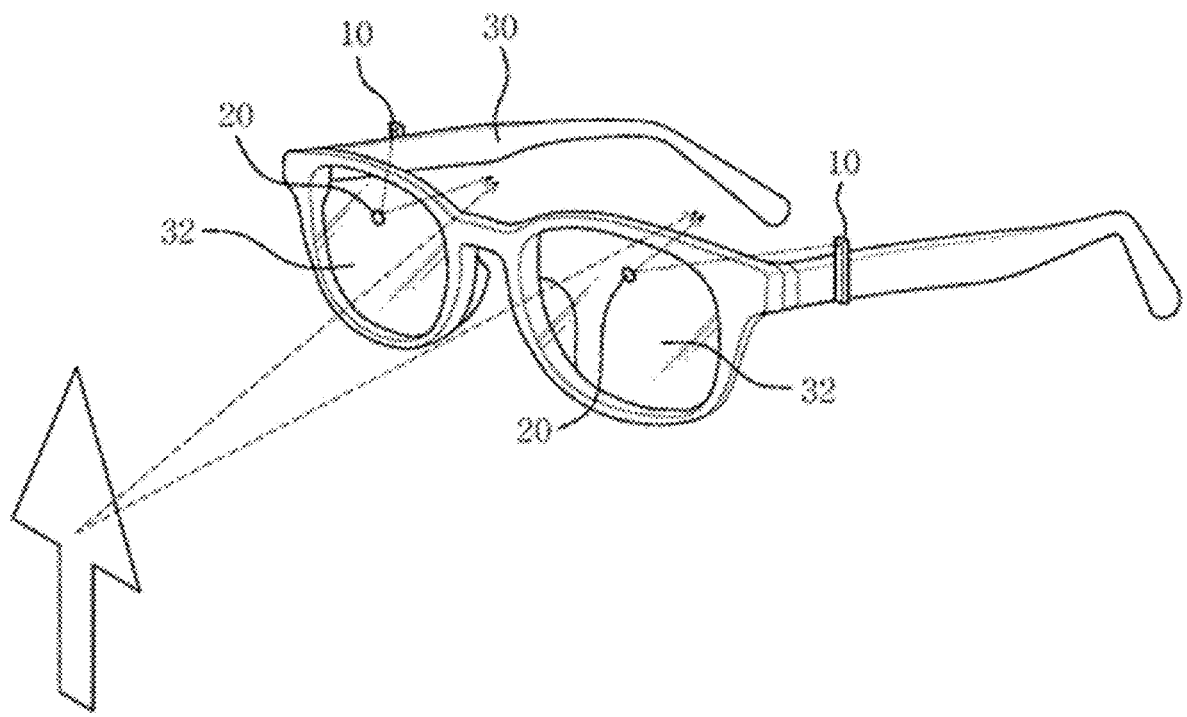
FIG. 2 shows an apparatus equipped with a depth of field control function for enabling augmented reality according to the present invention.

A display unit 10 is a component configured to generate a virtual image, and is installed on or in a frame part 30. For example, when the frame part 30 has a glass frame shape, the display unit 10 may be installed on or in the inside or outside of a temple. When the aesthetics of the apparatus is taken into account, the display unit 10 may be embedded in the temple so that the display unit 10 can be prevented from being seen from the outside. The display unit 10 corresponds to a surface light source, and thus generates a planar or curved (in the case of a flexible display) virtual image (although the display unit 10 is illustrated as seeming like a point light source in FIG. 2 for convenience sake, it is considered to be a surface light source). Alternatively, the display unit 10 may be installed at various locations. The display unit 10 may be installed at any location in the frame part 30 as long as light can be reflected via a depth of field control unit 20.

The depth of field control unit 20 is a component configured to reflect a virtual image generated by the display unit 10 to thus enable the virtual image to reach an eye of a user who wears the apparatus equipped with a depth of field control function for enabling augmented reality according to the present invention. In order to perform such depth of field control, it is preferred that the depth of field control unit 20 according to the present invention be made of material having high reflectance, such as a mirror, and formed in a circular shape and the size of the depth of field control unit 20 range from 50 to 700 µm in order to control the depth of field.

Furthermore, the depth of field control unit 20 may be formed in an elliptical shape when necessary. Although the apparatus equipped with a depth of field control function for enabling augmented reality according to the present invention ideally requires that the depth of field control unit 20 hang in the air, it is necessary to insert the depth of field control unit 20 into a lens having a large refractive index due to the structure thereof. Accordingly, the depth of field control unit 20 inserted into the lens is applied in a shape that is distorted according to an incident angle and a refractive index, i.e., an elliptical shape, rather than a circular shape. In order to prevent this distortion, a lens having a small refractive index may be used, or a shape may be adjusted in a direction opposite to a distortion direction in advance so that the shape of the distorted depth of field control unit 20 can be close to a circular shape. Nonetheless, an elliptical shape is appropriate for the shape of the depth of field control unit 20.

The reason why the depth of field control unit 20 is used to reflect a virtual image in the present invention is to solve the problem in which, conventionally, when a virtual image is surface-reflected using a prism or the like, a focus placed in the real world needs to be moved so that a user can clearly view the virtual image. When a virtual image is reflected using the depth of field control unit 20, the depth of field of the image is increased, and thus the virtual image can be significantly clearly viewed even when a user focuses on the real world.

Figure 3A:
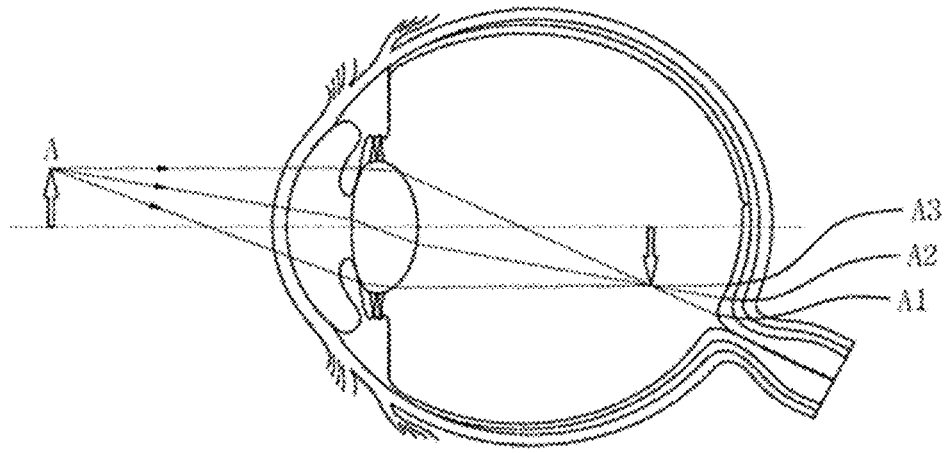
FIG. 3A is a diagram illustrating the reason why an object looks blurry when a nearsighted person views the object with the unaided eye.
Figure 3B:
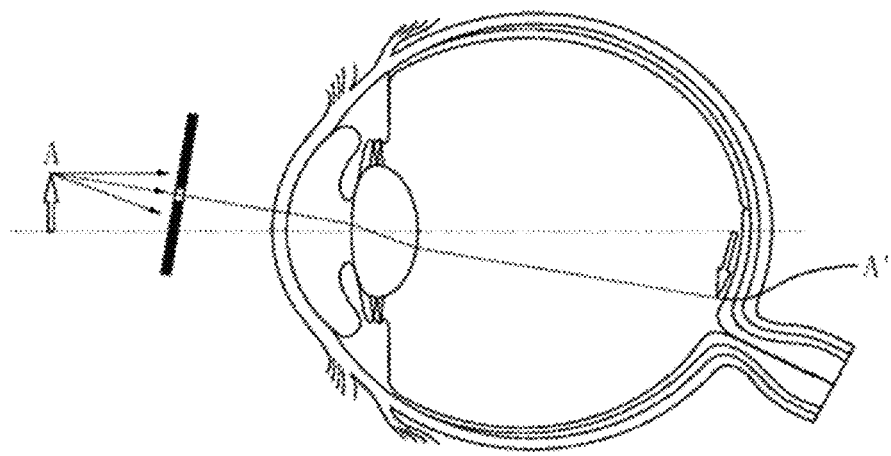
FIG. 3B is a diagram illustrating the reason why an object looks clearer when a nearsighted person wears a pinhole lens.
Figure 3C:
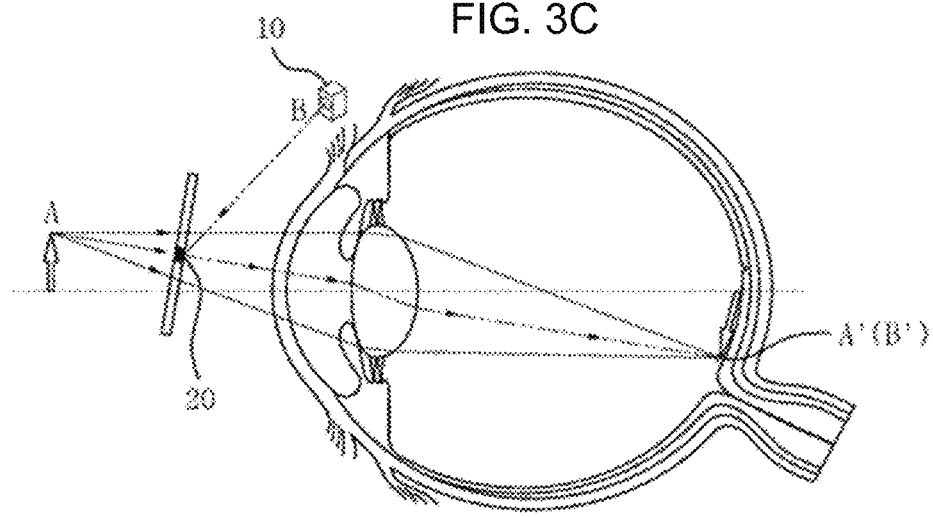
FIG. 3C is a diagram illustrating a case where a depth of field control unit is installed in front of an eye of a person.

In greater detail, the principle by which the depth of field control unit 20 is used in the present invention is considerably similar to that by which an image having a high depth of field is viewed via a pinhole in a pinhole camera or pinhole lens. FIGS. 3A to 3C are reference drawings illustrating the principle by which a clear image can be viewed when the image is viewed via a pinhole lens or a depth control unit.

FIG. 3A illustrates the reason why an object looks blurry when a nearsighted person views the object with the unaided eye. In the case of a nearsighted person, the crystalline lens is thick, and thus a focus is formed in front of the retina. Accordingly, an image of the object is not focused at a single point on the retina, but is spread, with the result that the object looks bury. Referring to FIG. 3A, light A starting from an object is spread to points A1, A2 and A3 over the retina.

FIG. 3B illustrates the reason why an object looks clearer when a nearsighted person wears a pinhole lens. Light starting from the object is restricted while passing through a pinhole, and thus an image of the object is formed within a smaller area on the retina, with the result that the object looks clearer than that in the case of the naked eye. Referring to FIG. 3B, light A starting from an object is formed within a narrower area A' on the retina. If only this phenomenon is taken into account, the conventional problem can be solved by passing light, starting from the display unit 10, through a pinhole to thus enable the light to reach an eye. However, in the case of the pinhole, another problem occurs. The other problem is a diffraction phenomenon. Since the light passed through the pinhole is spread due to diffraction, there is a limitation on the formation of a clear image. Furthermore, the extent to which an image becomes clearer due to a pinhole effect is inversely proportional to the size of the pinhole. Since diffraction increases in inverse proportion to the size of the pinhole, the use of the pinhole has a limitation.

The reason why the depth of field control unit 20 is used in the present invention is to reduce a diffraction effect while restricting the width of light, like a pinhole. FIG. 3C illustrates a case where a depth of field control unit is installed in front of an eye of a person. In this case, in the eye of the person, light A starting from an object is formed on the retina as A', and light B starting from the display unit 10 is superimposed on A' and formed as B'. In other words, A' and B' are formed at a single point on the retina, and thus a real world image and a virtual image are clearly viewed without the addition focusing of the eye.

In this case, the size of the depth of field control unit 20 needs to be smaller than 6-8 mm, i.e., the size of the pupil of the human eye, in order to achieve a pinhole effect, and the shape thereof is preferably circular. When an incident angle and a refractive index are taken into account, the shape of the depth of field control unit 20 is preferably elliptical. In this case, a general pinhole effect is achieved when the size of the depth of field control unit 20 is smaller than that of the pupil of the human eye. However, in order to enable a virtual image to be clearly viewed even when a user focuses on the real world by generating the effect of increasing the depth of field, the size of the depth of field control unit 20 preferably ranges from 50 to 700 μm.

However, as the size of the depth of field control unit 20 decreases, the brightness of a virtual image generated in the display unit 10 becomes lower. Accordingly, the size of the depth of field control unit 20 may be set by appropriately taking into account the clarity and brightness of a virtual image.

Since the depth of field control unit 20 has a relatively small size and is also installed immediately in the front of an eye (at about the location of a lens of glasses) in the present invention, it is difficult for a user to become aware of the depth of field control unit 20 when he or she focuses on the real world.

The depth of field control unit 20 may be silver foil (or another metal foil having high reflectance in the visible spectrum) itself, unlike a general mirror formed by applying silver foil to one surface of glass. The reason for this is that when the apparatus equipped with a depth control function for enabling augmented reality according to the present invention is actually manufactured, objects, such as the lenses of glasses, are present in front of the eyes of a human and the depth of field control unit 20 is embedded in one of the lenses, and thus glass is not required, unlike in a general mirror.

The surfaces of the depth of field control unit 20 may be planar or curved surfaces. For example, when the area of the depth of field control unit 20 is increased in order to make a virtual image bright, the depth of field may be decreased (accordingly, the range within which a focus can be placed is also decreased). Focusing is facilitated by making the surfaces of the depth of field control unit 20 curved. Furthermore, an enlargement/reduction effect may be achieved, like in a concave mirror or convex mirror.

The frame part 30 is a target configured such that the display unit 10 and the depth of field control unit 20 are installed thereon or therein, and is also a component configured to form the framework and appearance of the apparatus so that a user can wear the apparatus equipped with a depth of field control function for enabling augmented reality according to the present invention. The frame part 30 may be a glass frame, a goggle frame, the body of a helmet, the body of an HMD, or the like.

The frame part 30 may include view field parts 32. The view field parts 32 are components configured to provide a field of view so that a user can view the real world, and the material of the view field parts 32 is transparent or translucent. According to the principle of the present invention, only when the display unit 10 and the depth of field control unit 20 are installed on or in the frame part 30 in an appropriate manner is the operation of the apparatus possible. However, in practice, when the apparatus is manufactured, it is difficult to hang only the depth of field control unit 20 in front of an eye.

Accordingly, this problem can be solved by installing the depth of field control unit 20 on or in one of the view field part 32. For example, the depth of field control unit 20 may be installed in or on one of the lenses of glasses or the transparent cover of a helmet. The depth of field control unit 20 may be embedded in one of the lens of glasses or the transparent cover of a helmet, or may be installed on the surface thereof so that it can be exposed to the outside. When the protection of the depth of field control unit 20, the robustness and appearance of the apparatus, etc. are taken into account, the depth of field control unit 20 is preferably embedded in one of the view field parts 32.

Furthermore, a part or all of the view field parts 32 may be formed to be opaque, thereby eliminating an actual field of view and preferentially providing a virtual field of view. This type of view field parts 32 may be utilized for a visually impaired person. In this case, a configuration may be made such that the degree of the opaqueness of the view field parts 32 can be adjusted.

Figure 1:
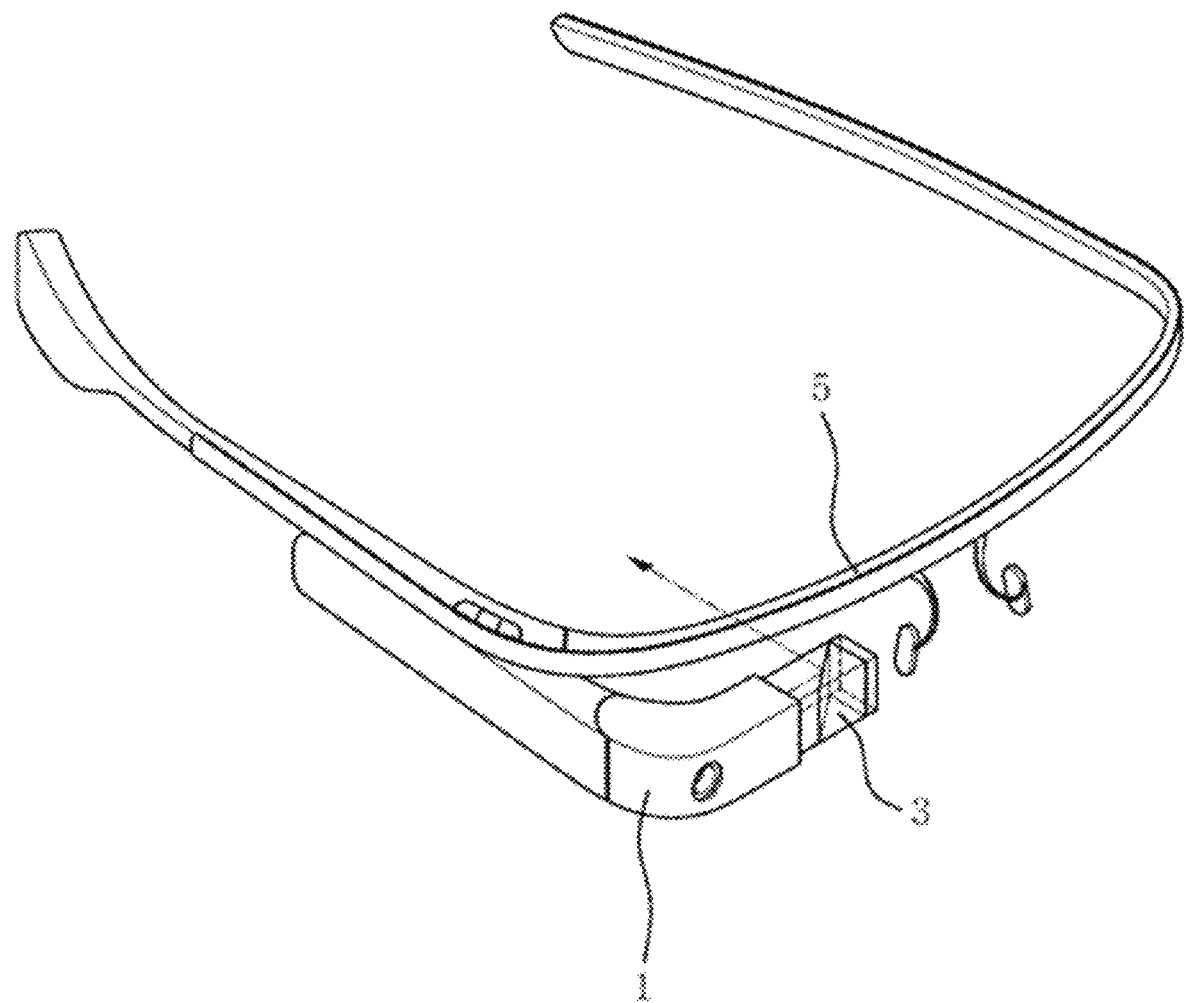
FIG. 1 shows a conventional glasses-type apparatus for enabling augmented reality.

The apparatus equipped with a depth control function for enabling augmented reality according to the present invention has been described above. The foregoing description is intended for a single eye. The apparatus equipped with a depth of field control function for enabling augmented reality according to the present invention may include one display unit 10 and one depth of field control unit 20, or may include two display units 10 and two depth of field control units 20 for both eyes. When one display unit 10 and one depth of field control unit 20 are included, there can be viewed an image that can be viewed via the conventional glasses-type apparatus equipped with a depth of field control function for enabling augmented reality, which is shown in FIG. 1. In contrast, when two display units 10 and two depth of field control units 20 are included, a virtual image having a three-dimensional effect can be viewed with both eyes.

MODE FOR INVENTION

Figure 4:
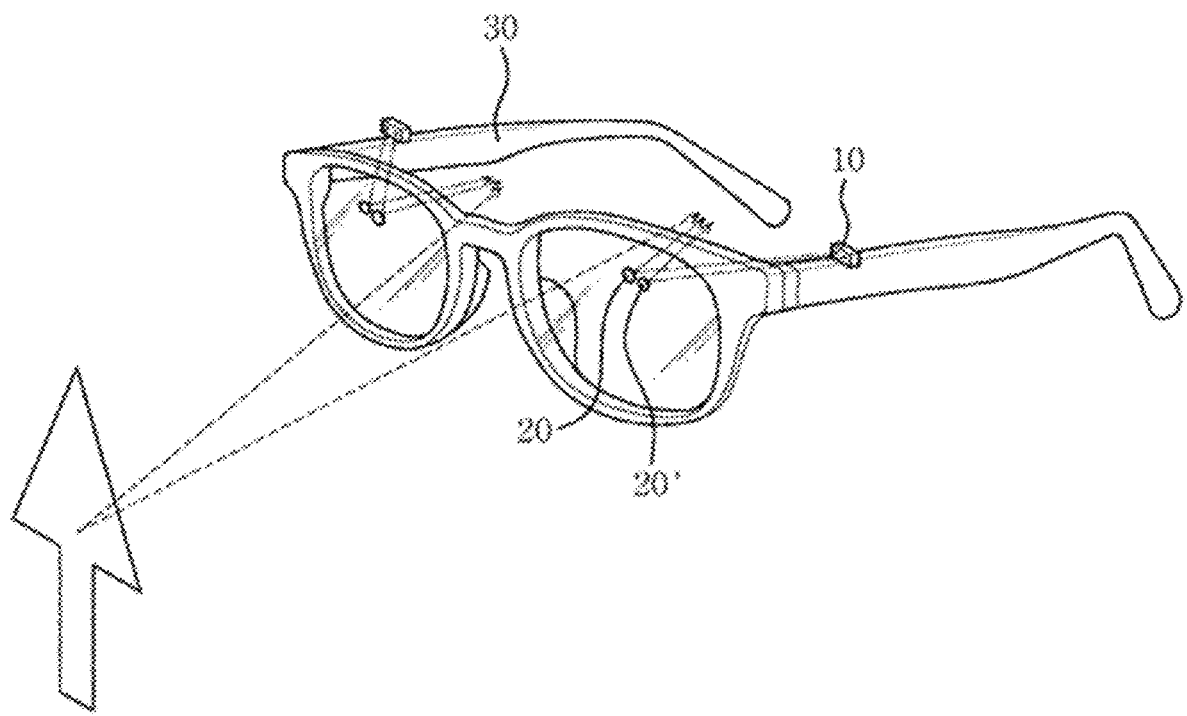
FIG. 4 shows another embodiment of an apparatus equipped with a depth of field control function for enabling augmented reality according to the present invention.

FIG. 4 shows another embodiment of an apparatus equipped with a depth control function for enabling augmented reality according to the present invention.

The apparatus equipped with a depth of field control function for enabling augmented reality according to the present invention may include one display unit 10 and a plurality of depth of field control units 20 and 20' for a single eye. In this case, a wide viewing angle can be implemented (the viewing angle that can be secured by one depth of field control unit 20 ranges from about 15 to 50°). It will be apparent that this configuration may be applied for both eyes.

Figure 5:
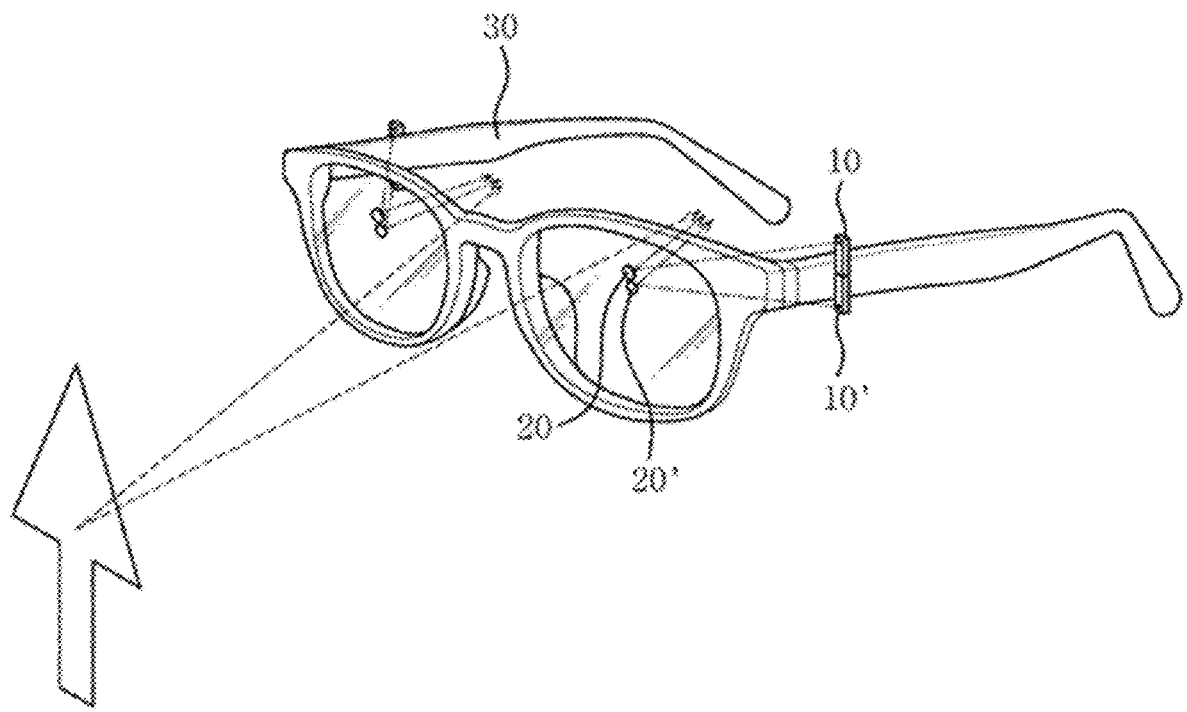
FIG. 5 shows still another embodiment of an apparatus equipped with a depth of field control function for enabling augmented reality according to the present invention.

FIG. 5 shows still another embodiment of an apparatus equipped with a depth of field control function for enabling augmented reality according to the present invention.

The apparatus equipped with a depth of field control function for enabling augmented reality according to the present invention may include a plurality of display units 10 and 10' and a plurality of depth of field control units 20 and 20' for a single eye. In this case, a plurality of virtual images may be implemented as an augmented reality. It will be apparent that this configuration may be applied for both eyes.

Furthermore, as the combination of the embodiments shown in FIGS. 4 and 5, for a single eye, a plurality of display units may be included, a plurality of depth of field control units corresponding to each of the display units may be included. In this case, a plurality of virtual images may be implemented in a wide viewing angle, and also multiple independent screens may be operated.

Figure 6:
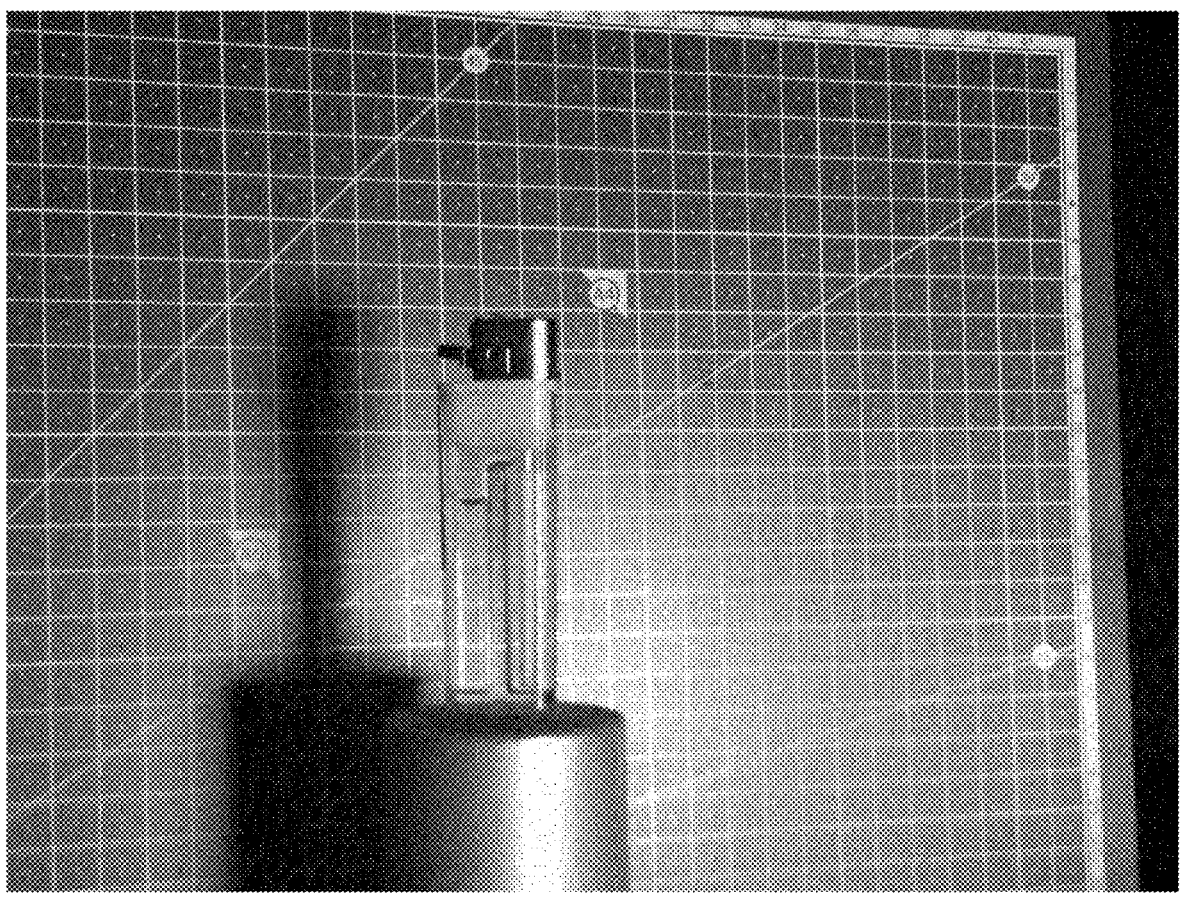
FIG. 6 is a real world image.
Figure 7:
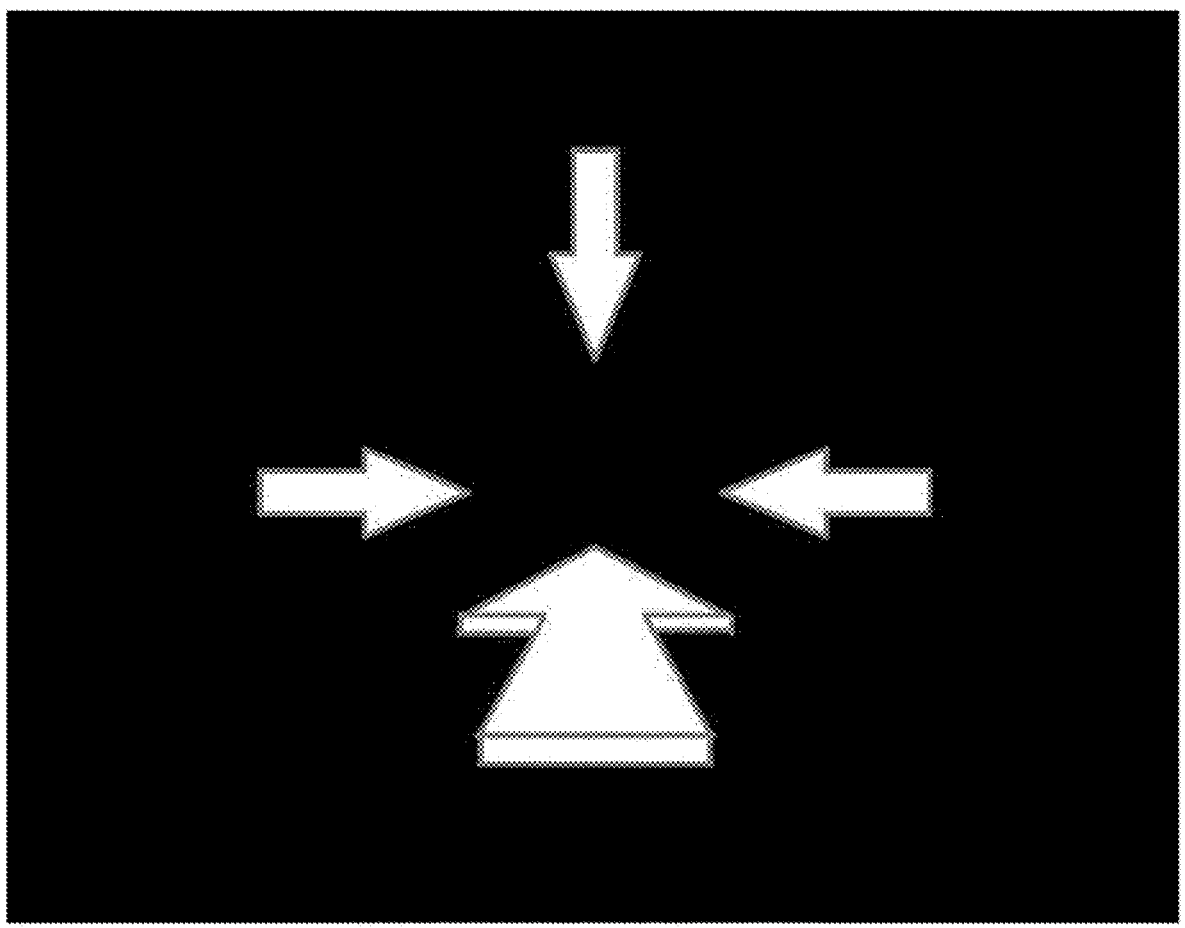
FIG. 7 is a virtual image.
Figure 8:
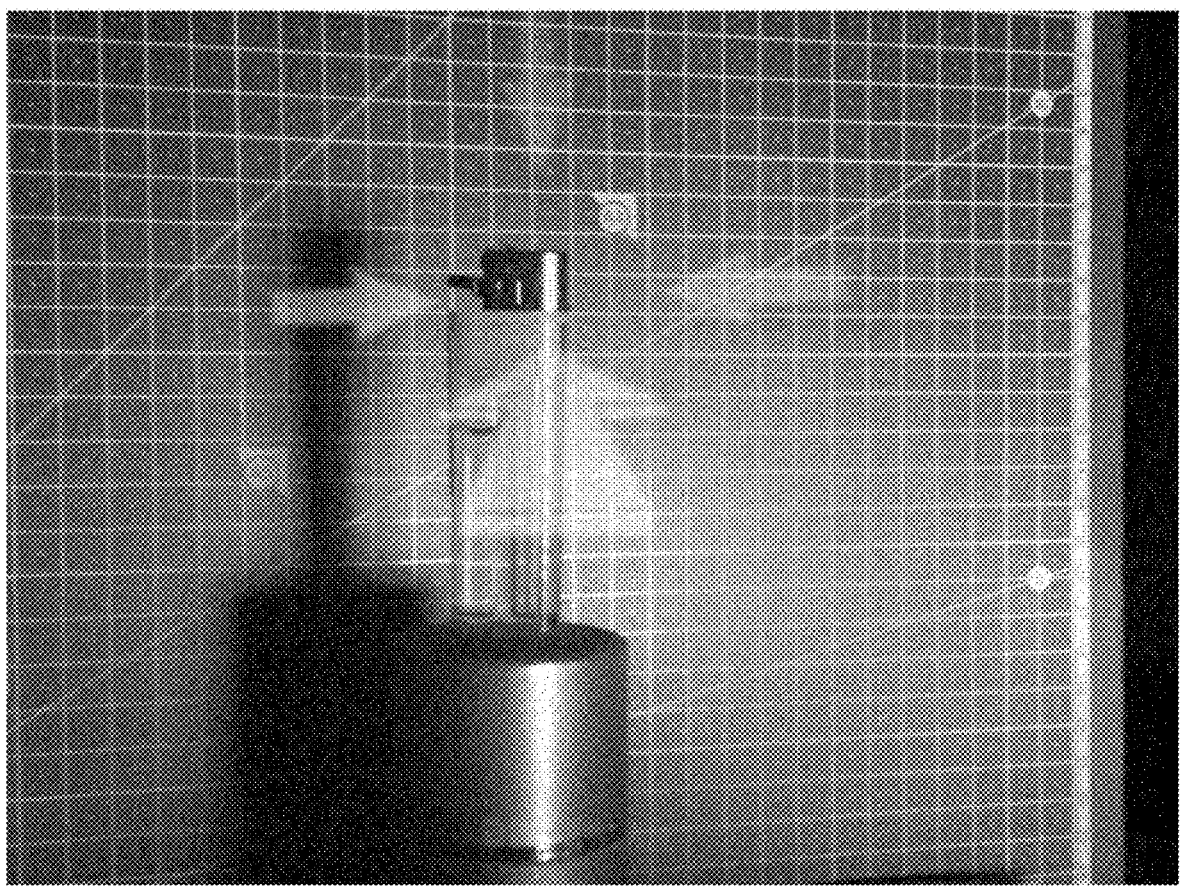
FIG. 8 shows an image in which both the real world image and the virtual image have been simultaneously implemented as an augmented reality.

FIGS. 6 to 8 are experimental images for the apparatus equipped with a depth of field control function for enabling augmented reality according to the present invention, wherein FIG. 6 is a real world image, and FIG. 7 is a virtual image. Referring to FIG. 8, it can be seen that both the real world image and the virtual image have been simultaneously and desirably implemented as an augmented reality.

Figure 9A:
FIG. 9A and FIG. 9B show images acquired by adjusting the focus of a camera via the apparatus for enabling augmented reality according to the present invention.
Figure 9B:

FIGS. 9A and 9B show images acquired by adjusting the focus of a camera via the apparatus for enabling augmented reality according to the present invention. FIG. 9A is an image when the camera is focused on a close location, and FIG. 9B is an image when the camera is focused on a remote location. Referring to FIGS. 9A and 9B, it can be seen that the virtual images are all viewed clearly when the camera is focused on the close location and when the camera is focused on the remote location. The reason for this is that an image reflected via the depth of field control unit 20 is not simply reflected, but reaches a user (the camera in the example of FIGS. 9A and 9B) in the state in which the depth of field of the image has been increased, and thus a user can naturally and simultaneously focus on both an object in the real world and a virtual image without additional effort.

In the foregoing description, detailed descriptions of a configuration of supplying power to the display unit 10, a configuration of providing image data to the display unit 10, and a configuration of controlling the display unit 10 have been omitted. The reason for this is that these configurations are not significantly related to the essential technical spirit of the present invention and are variable in practice.

What is claimed is:

1. An apparatus equipped with a depth of field control function for enabling augmented reality, the apparatus being wearable on a user, the apparatus comprising:

a display unit (10) configured to generate a virtual image;

a depth of field control unit (20) configured to have a size smaller than an eye pupil of a human, and also configured to reflect the virtual image generated in the display unit (10), to increase a depth of field of the virtual image, and to then enable the virtual image to reach an eye of the user; and a frame part (30) configured such that the display unit (10) and the depth of field control unit (20) are installed thereon or therein, and also configured to enable the user to wear the apparatus for enabling augmented reality wherein a surface of the depth of field control unit (20) is planar, wherein the depth of field control unit (20) is made of metal foil having high reflectance in a visible spectrum, and wherein the depth of field control unit (20) is embedded in a lens and is formed in an elliptical shape so that the shape of the depth of field control unit (20) looks close to a circular shape to the user by distortion in the lens due to an incident angle and a refractive index of the lens.

2. The apparatus of claim 1, wherein the display unit (10) is embedded in the frame part (30).

3. The apparatus of claim 1, wherein the frame part (30) is any one of a glass frame, a goggle frame, a body of a helmet, and a body of an HMD.

4. The apparatus of claim 1, wherein the frame part (30) comprises view field parts (32) configured to provide a field of view to the user and made of transparent or translucent material.

5. The apparatus of claim 4, wherein the depth of field control unit (20) is installed on or in one of the view field parts (32).

6. The apparatus of claim 5, wherein a part or all of the view field parts (32) is formed to be opaque.

7. The apparatus of claim 1, comprising two display units (10) and two depth of field control units (20) for both eyes of the user.

8. The apparatus of claim 1, comprising one display unit (10) and a plurality of depth of field control units (20 and 20') for a single eye of the user.

9. The apparatus of claim 1, wherein the size of the depth of field control unit (20) is less than 8 mm.

10. The apparatus of claim 1, wherein the size of the depth of field control unit (20) is in a range from 50 to 700 μm.

* * * * *